United States Patent
Feltham et al.

(10) Patent No.: US 9,742,976 B2
(45) Date of Patent: Aug. 22, 2017

(54) PEER TO PEER CAMERA COMMUNICATION

(71) Applicant: International Business Machines Corporation, Armonk, NY (US)

(72) Inventors: Andrew S. Feltham, Chandlers Ford (GB); Elizabeth J. Maple, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/791,503

(22) Filed: Jul. 6, 2015

(65) Prior Publication Data

US 2016/0014320 A1    Jan. 14, 2016

(30) Foreign Application Priority Data

Jul. 8, 2014   (GB) .................................. 1412093.5

(51) Int. Cl.
*H04N 5/232*   (2006.01)
*H04N 1/00*    (2006.01)
(Continued)

(52) U.S. Cl.
CPC ..... *H04N 5/23206* (2013.01); *H04N 1/00204* (2013.01); *H04N 5/23203* (2013.01);
(Continued)

(58) Field of Classification Search
CPC ............... H04N 5/232; H04N 5/23203; H04N 5/23206; H04N 5/23209
(Continued)

(56) References Cited

U.S. PATENT DOCUMENTS 6,188,431 B1 * 2/2001 Oie ...................... H04N 1/2112
                                                                  348/14.14
7,221,520 B2   5/2007 Dowling et al.
(Continued)

FOREIGN PATENT DOCUMENTS

CA   2802293 A1   8/2013
EP   1881501 A1   1/2008
(Continued)

OTHER PUBLICATIONS

IBM: List of IBM Patents or Patent Applications Treated as Related (Appendix P), Jul. 6, 2015, pp. 1-2.
(Continued)

*Primary Examiner* — Anthony J Daniels
(74) *Attorney, Agent, or Firm* — Stosch Sabo

(57) ABSTRACT

A camera, method and computer program for communicating between a primary camera device and other camera devices comprising: detecting orientation and position of the primary camera device and range of a primary subject in focus on the primary camera device; locating other networkable camera devices for communication; receiving subject data for a real time image of a subject from one or more of the located networkable camera devices; and determining from subject data which networkable camera devices are shooting the primary subject whereby the primary camera can utilize the subject data and image data from both its own detectors and determined network cameras to take a picture of the subject.

19 Claims, 5 Drawing Sheets

(51) Int. Cl.
*H04N 5/77* (2006.01)
*H04W 4/02* (2009.01)
*H04N 5/765* (2006.01)
*H04N 5/247* (2006.01)
*H04N 101/00* (2006.01)

(52) U.S. Cl.
CPC ............ *H04N 5/247* (2013.01); *H04N 5/765* (2013.01); *H04N 5/772* (2013.01); *H04W 4/026* (2013.01); *H04N 2101/00* (2013.01)

(58) Field of Classification Search
USPC .................................................. 348/211.99
See application file for complete search history.

(56) References Cited

U.S. PATENT DOCUMENTS

| | | | |
|---|---|---|---|
| 7,394,366 B2 | 7/2008 | Moquin et al. | |
| 7,840,130 B2 | 11/2010 | Kucharyson | |
| 7,990,422 B2 * | 8/2011 | Ahiska | G08B 13/19608 348/211.3 |
| 8,121,468 B2 | 2/2012 | Clark | |
| 8,131,541 B2 | 3/2012 | Yen et al. | |
| 8,144,204 B2 | 3/2012 | Strandwitz et al. | |
| 8,164,617 B2 | 4/2012 | Mauchly | |
| 9,509,867 B2 * | 11/2016 | Camp, Jr. | H04M 1/72572 |
| 2003/0133018 A1 | 7/2003 | Ziemkowski | |
| 2006/0165405 A1 | 7/2006 | Kanai et al. | |
| 2007/0223901 A1 | 9/2007 | Fujimoto | |
| 2011/0109726 A1 | 5/2011 | Hwang et al. | |
| 2011/0211096 A1 | 9/2011 | Aagaard et al. | |
| 2012/0044354 A1 | 2/2012 | Cheng et al. | |
| 2012/0169873 A1 | 7/2012 | Hsieh | |
| 2012/0268616 A1 | 10/2012 | Strandwitz et al. | |
| 2012/0307091 A1 * | 12/2012 | Yumiki | H04N 5/23203 348/211.4 |
| 2013/0120596 A1 | 5/2013 | Yau | |
| 2013/0120636 A1 * | 5/2013 | Baer | G03B 15/05 348/335 |
| 2013/0210563 A1 * | 8/2013 | Hollinger | H04N 5/2252 473/570 |
| 2013/0271613 A1 * | 10/2013 | Retterath | G08G 1/096758 348/169 |
| 2014/0028817 A1 | 1/2014 | Brockway, III et al. | |
| 2014/0043493 A1 | 2/2014 | Bateman et al. | |
| 2014/0043495 A1 | 2/2014 | Bateman et al. | |
| 2014/0362246 A1 * | 12/2014 | Nakano | H04N 5/23206 348/211.4 |

FOREIGN PATENT DOCUMENTS

| | | |
|---|---|---|
| GB | 2482140 A | 1/2012 |
| JP | 5084640 B2 | 11/2012 |
| WO | 2007052269 A2 | 5/2007 |
| WO | 2012100114 A2 | 7/2012 |

OTHER PUBLICATIONS

Pending U.S. Appl. No. 14/791,504, filed Jul. 6, 2015, entitled: "Peer to Peer Lighting Communication", 24 pages.
Pending U.S. Appl. No. 14/791,506, filed Jul. 6, 2015, entitled: "Peer to Peer Audio Video Device Communication", 24 pages.
GB Office Action; Notification of Reasons for Refusal,Application No. GB1412095.0. Apr. 29, 2016. 2 pages.
Decision to Grant a Patent, Jul. 5, 2016. 2 pages.
List of IBM Patents or Patent Applications Treated as Related, Jan. 20, 2017, 2 pages.
Feltham et al., "Peer to Peer Audio Video Device Communication", U.S. Appl. No. 15/412,200, filed Jan. 23, 2017.
"Communication options for Canon's Wireless File Transmitters", Canon Professional Network, http://cpn.canon-europe.com/content/education/technical/wifi_options.do, Jul. 2011, pp. 1-9.
"Compatibility information on Wi-Fi enabled Canon digital compact cameras", compatibility-information—Wireless Compact Cameras—Canon UK, http://www.canon.co.uk/for_home/product_finder/cameras/digital_camera/wi-fi/compatibility-information/, Accessed on Mar. 16, 2015, pp. 1-12.
Wikipedia, "Epipolar geometry", http://en.wikipedia.org/wiki/Epipolar_geometry, Accessed on Mar. 26, 2015, pp. 1-4.
GB Application No. 1412093.5, filed on Jul. 8, 2014, entitled: "Peer to Peer Camera Communication", 23 pages.
United Kingdom Search Report, Application No. GB1412093.5, Dated Feb. 2, 2015, 3 pages.
GB Application No. 1412094.3, filed on Jul. 8, 2014, entitled: "Peer to Peer Camera Lighting Communication", 24 pages.
United Kingdom Search Report, Application No.: GB1412094.3, Dated Feb. 2, 2015, 3 pages.
GB Application No. 1412095.0, filed on Jul. 8, 2014, entitled: "Peer to Peer Audio Video Device Communication", 24 pages.
United Kingdom Search Report, Application No. GB1412095.0, Dated Jan. 14, 2015, 4 pages.
Wikipedia, "Geotagged photograph", Geotagged photograph—Wikipedia, the free encyclopedia, http://en.wikipedia.org/wiki/Geotagged_photograph#Automatic_using_a_built_in_GPS, Accessed on Mar. 26, 2015, 4 pages.
Goldstein, "Getting Started with Off-Camera Flash", Photography Blog, http://www.photographyblog.com/articles/getting_started_with_off-camera_flash/, Feb. 18, 2011, pp. 1-7.
Iqbal et al., "A Distributed Camera Network Architecture Supporting Video Adaptation", 2009 IEEE, pp. 1-7.
Solmeta, "GPS receiver for Nikon camera > Geotagger N2", Product_View, http://www.solmeta.com/Product/show/id/3 , Accessed on Mar. 26, 2015, pp. 1-2.
"Wireless Networking with Nikon Cameras", Wireless Networking with Nikon Cameras, http://cdn-10.nikon-cdn.com/pdf/nikon_wireless.pdf, pp. 1-22.

* cited by examiner

Camera Network Module 400

Camera Network Identifier 402

Camera Network Database 404

Primary Subject Camera Identifier 406

Camera Condition Range Identifier 408

Camera Setting Engine 410

Picture Attribute Scanner and Manager 412

Camera Network Method 500

Fig. 4

PEER TO PEER CAMERA COMMUNICATION

BACKGROUND

The present invention generally relates to a method and apparatus for peer to peer camera communication. More particularly, a method and apparatus for a camera device to share picture and camera settings within a network of cameral devices.

The following publications describe the general prior art for networked cameras.

Patent publication U.S. 2014/0028817 A1 discloses a credential transfer management system.

Patent publication U.S. 2011/0211096 A1 discloses a video system and methods for operating a video system.

Patent publication JP 5084640 B2 discloses a data receiver, a data transmission device and a control method.

Patent publication U.S. 2014/0043495 A1 discloses a wireless video camera and connection methods including multiple video or audio streams.

Patent publication CA 2802293 A1 discloses a method and device for sharing a camera feature.

U.S. Pat. No. 8,144,204 B2 discloses a self-contained wireless camera device, wireless camera system and method.

U.S. Pat. No. 8,164,617 B2 discloses combining views of a plurality of cameras for a video conferencing endpoint with a display wall.

SUMMARY

In a first aspect of the invention there is provided a primary camera device for communicating with other camera devices, said primary camera device comprising: detectors for detecting orientation and position of the primary camera device and distance from a primary subject in focus on the primary camera device; a camera network identifier for locating other networkable camera devices for communication; a camera network database for receiving subject data for a real time image of a subject from one or more of the located networkable camera devices; and a primary subject camera identifier for determining from subject data which networkable camera devices are shooting the primary subject whereby the camera can utilize the subject data and image data, from its own detectors and determined network cameras, to take a picture of the subject.

In a second aspect of the invention there is provided a method for communicating between a primary camera device and other camera devices comprising: detecting orientation and position of the primary camera device and distance from a primary subject in focus on the primary camera device; locating other networkable camera devices for communication; receiving subject data for a real time image of a subject from one or more of the located networkable camera devices; and determining from subject data which networkable camera devices are shooting the primary subject whereby the primary camera can utilize the subject data and image data, from its own detectors and the determined network cameras, to take a picture of the subject.

Preferably the method further comprising requesting one or more determined networkable camera devices to take one or more pictures of the subject.

More preferably the method further comprising receiving camera capability data from determined networkable camera devices.

Still more preferably the method further comprising determining a range of camera conditions from the determined camera devices.

Yet more preferably the method further comprising determining a range of camera settings most suitable for the range of conditions and communicating those settings to appropriate determined camera devices.

Even more preferably camera settings are optimized according to individual the camera capability.

Advantageously the network is a peer to peer network.

More advantageously the networkable cameras exchange one or more pictures.

The embodiments have an effect that operates at a machine level of a camera device and below any overlying application level. The embodiments have an effect that results in a camera device being made to operate in a new way.

In a third aspect of the invention there is provided a computer program product for communicating between a primary camera device and other camera devices, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Preferred embodiments of the present invention will now be described, by way of example only, with reference to the following drawings in which:

FIG. 4 is a component diagram of a camera network module of the preferred embodiment.

DETAILED DESCRIPTION

Figure 1:
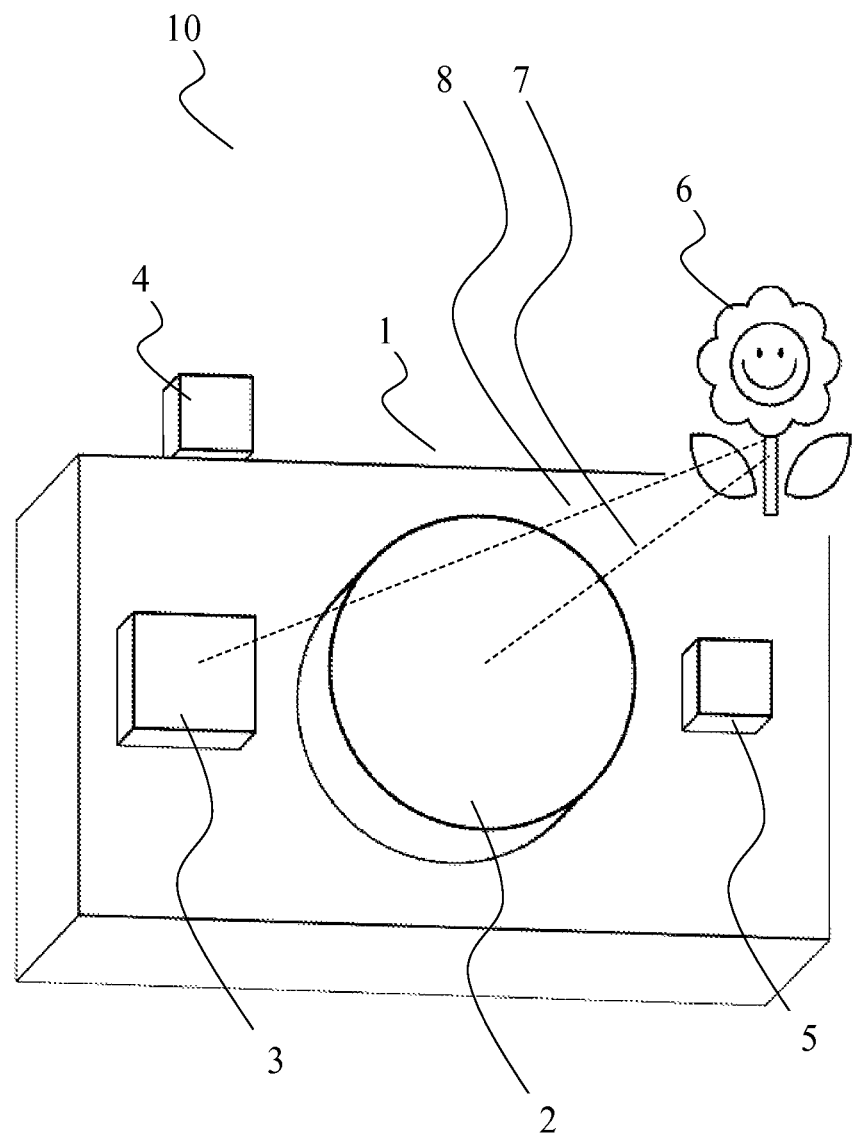
FIG. 1 is an isometric schematic diagram of a camera according to the preferred embodiment.

Referring to FIG. 1, a camera 10 according to the preferred embodiment comprises: a camera body 1; a camera lens 2; a distance sensor 3; camera picture button 4; radio aerial 5; and a camera control unit 12 (hidden from view inside camera body 1 but shown in FIG. 3) for taking a photograph of a subject 6. Further features and components are necessarily part of a functioning camera unit and the above features are a simplified list of features that can explain the preferred embodiment.

Camera body 1 supports the camera lens 2 so that a picture can be taken of subject 6 whereby light from subject 6 is collected by the lens 2 and focused onto an electronic sensor that is part of the camera control unit 12 (not shown).

Camera lens 2 is adjustable for bringing a picture into focus. The line of focus is represented by dotted line 7 from the center of the lens to subject 6.

Distance sensor 3 is for sensing the distance between the camera and subject 6. Typically an infrared light from distance sensor 3 is bounced off subject 6 and received back at distance sensor 3 such that the distance that the light has travelled along dotted line 8 from distance sensor 3 to the subject 6 can be estimated.

Camera picture button 4 is used to control the camera to focus the camera lens on the object (typically a half depress of the button) and then take the photograph (typically a full depress of the button).

Radio aerial 5 is for sending and receiving wireless radio signals to other nearby cameras according to the preferred embodiment. In the preferred embodiment the radio signal is a low power personal network signal such a Bluetooth signal to enable a peer to peer network but other radio signal can be used including WiFi. Bluetooth is a low power wireless technology standard for exchanging data over short distances typically between personal devices in a room or car or small personal area. WiFi is a local area wireless technology that allows an electronic device to exchange data or connect to the internet throughout buildings. In the preferred embodiment it is envisaged that peer to peer architecture would be the most advantageous but a client server architecture would also work. For instance, a GSM (global system for mobile telecommunications) signal can be used to create a client server embodiment where many cameras communicate with a server.

Figure 3:
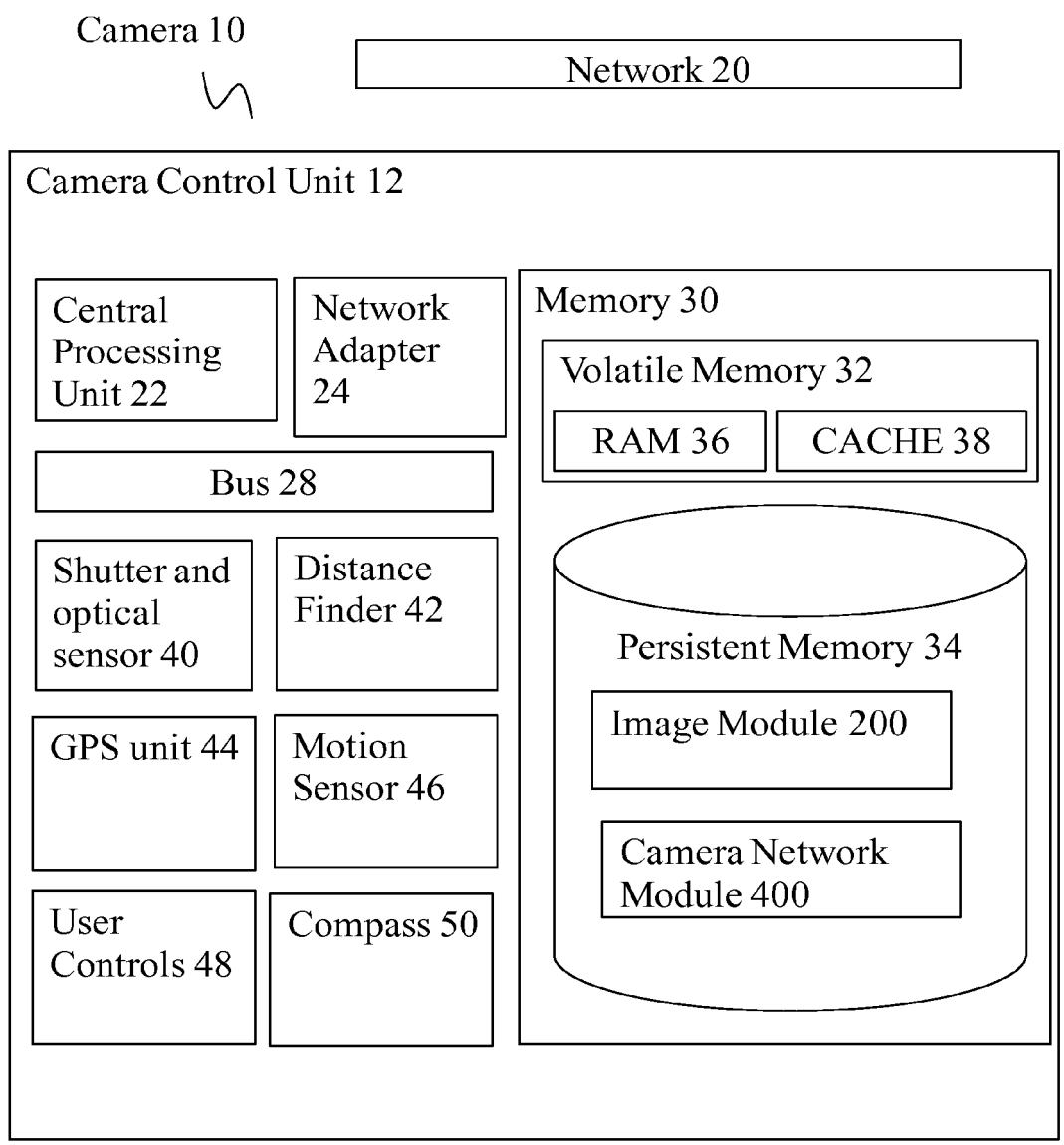
FIG. 3 is a component diagram of a camera of the preferred embodiment.

Camera control unit 12 is internal to the camera body 1 and described in FIG. 3.

Figure 2:
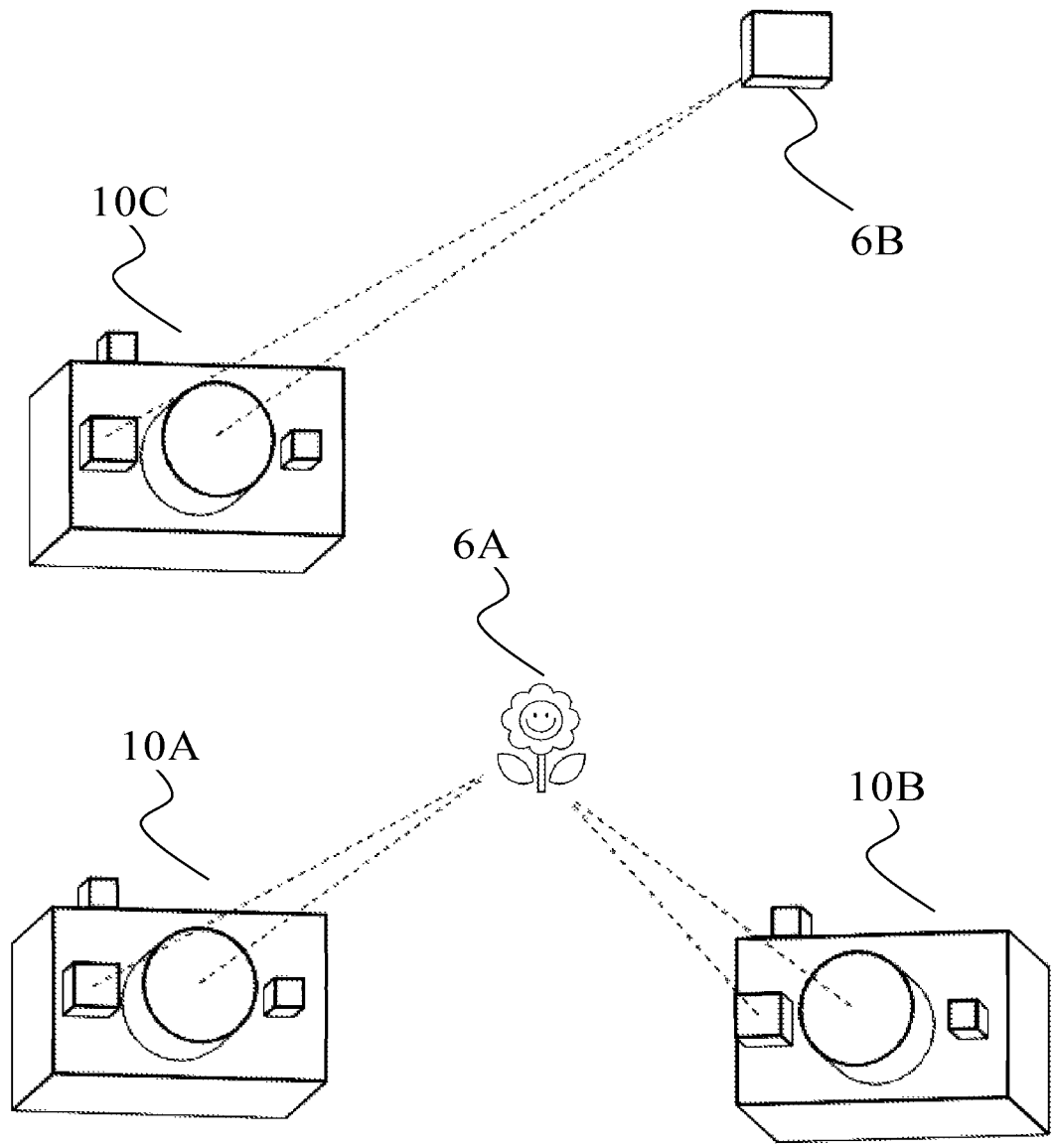
FIG. 2 is a deployment diagram of three cameras in a network according to the preferred embodiment.

FIG. 2 is an example deployment diagram of cameras 10A, 10B and 10C in a network according to the preferred embodiment. More cameras can be used but the number of cameras will be limited by the processing power of the cameras and the network bandwidth amongst other things. In this example, cameras 10A (for example the primary camera) and 10B (a networkable camera) are pointing to the same subject 6A whereas camera 10C (another networkable camera) is pointing to another object 6B. All the cameras are capable of communicating with each other and the preferred embodiment determines those networkable cameras that are pointing to the same subject 6A.

Referring to FIG. 3, the camera control unit 12 of a camera 10 is described. Camera 10 is a combination of a mechanical, electronic and computer system wherein the camera control unit 12 may be described in the general context of computer system including computer system-executable instructions, such as program modules, being executed by a computer processor. Generally, program modules may include routines, programs, objects, components, logic, and data structures that perform particular tasks or implement particular abstract data types.

Camera control unit 12 comprises: central processing unit (CPU) 22; network adapter 24; bus 28; memory 30; shutter and optical sensor 40; distance finder 42; GPS unit 44; motion sensor 46; user controls 48 and compass 50.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the cameras or a computer server (not shown).

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital versatile disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises image module 200 and camera network module 400. Further program modules that support the preferred embodiment but are not shown include firmware, boot strap program, operating system, and support applications. Each of the operating system, support applications, other program modules, and program data or some combination thereof, may include an implementation of a networking environment.

Image module 200 is a known camera control mechanism for taking a picture.

Camera network module 400 is for working with existing camera control mechanisms to take a picture according to the preferred embodiment and is described in more detail below.

Shutter and optical sensor 40 is for taking the picture and recording a picture image as pixels on the optical sensor.

Distance finder 42 is for controlling the distance sensor 3 and calculating the distance between the camera and a subject.

GPS (Global Positioning System) unit 44 is for calculating the absolute position in space of the camera.

Motion sensor 46 is for fine tuning the absolute position calculation as the camera is moved.

User controls 48 is the interface for all user controls including the camera picture button 4.

Compass 50 is a three dimensional gyroscope compass for determining the precise orientation of the camera in order to determine where the camera is pointing so that the subject of the picture may be subsequently determined.

Referring to FIG. 4, camera network module 400 comprises the following components: camera network identifier 402; camera network database 404; primary subject camera identifier 406; camera condition range identifier 408; camera setting engine 410; picture attribute scanner and manager 412; and camera network method 500.

Camera network identifier 402 is for identifying a network of cameras.

Camera network database 404 is for receiving subject data and camera capability data from networked cameras.

Primary subject camera identifier 406 is for identifying a primary subject from the subject data of the networked cameras.

Camera condition range identifier 408 is for determining a range of environmental conditions for each networked camera such as distance from camera and amount of background and foreground light on primary subject.

Camera setting engine 410 is for determining optimum camera and camera setting pairings from the range of environmental conditions and the camera capability data.

Picture attribute scanner and manager 412 is for determining and managing picture attributes.

Camera network method 500 is for controlling and managing components in accordance with the preferred embodiment.

Figure 5:
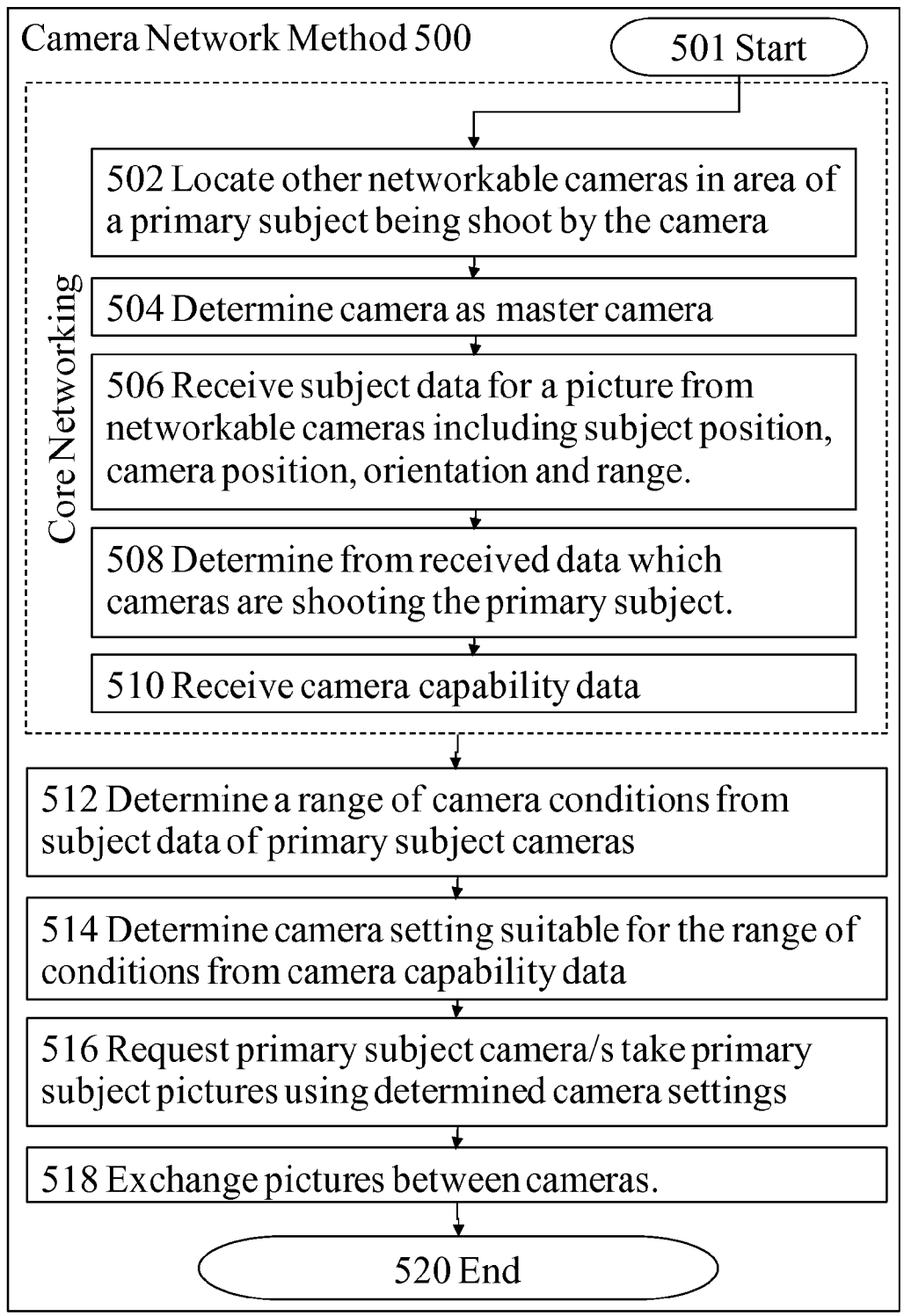
FIG. 5 is a flow diagram of a process of the preferred embodiment.

Referring to FIG. 5, camera network method 500 comprises logical process steps 501 to 520.

Step 501 is the start of camera network method 500. The preferred camera embodiment is always in network mode and the method is started when picture button 4 is half depressed for focusing on a primary subject. Other embodiments are envisaged where a user can select and deselect a network mode.

Step 502 is for locating other networkable cameras in network area of a primary subject being shoot by the camera. The network area can be the whole possible network area or a restricted part of the possible network area.

Step 504 is for setting the camera with the half depressed picture button 4 as master camera, that is the camera device that controls the other camera devices in a peer-to-peer network.

Step 506 is for receiving subject data for a picture from networkable cameras including subject position, camera position, orientation and range.

Step 508 is for determining from received data which cameras are shooting the primary subject.

Step 510 is for receiving camera capability data.

Steps 502 to 510 comprise core networking steps that the embodiments are based on. As a result of the core networking steps the master camera can utilize the subject data and image data from both its own detectors and determined network cameras to take a picture of the subject.

Step 512 is for determining a range of camera conditions from subject data of primary subject cameras.

Step 514 is for determining camera setting suitable for the range of conditions from camera capability data.

Step 516 is for requesting primary subject camera/s to take primary subject pictures using determined camera settings.

Step 518 is for exchanging pictures of the primary subject between cameras.

Step 520 is the end of the method.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

A further embodiment of the invention is a computer program product defined in terms of a system and method. The computer program product may include a computer-readable storage medium (or media) having computer-readable program instructions thereon for causing a processor to carry out aspects of the present invention. Such a program can be transferred to an existing camera as an update to its operating system.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose camera, special purpose camera, camera device, a device with a camera, or other programmable data processing apparatus to produce a machine with a camera, such that the instructions, which execute via the processor, create means for implementing the functions/acts specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A primary camera device for communicating with other camera devices, said primary camera device comprising:
   detectors for detecting orientation and position of the primary camera device and range of a primary subject in focus on the primary camera device;
   a camera network identifier for locating networkable camera devices for communication, wherein the camera network identifier is configured to locate the networkable camera devices in response to a picture button on the primary camera device being partially depressed, and wherein the primary camera device is configured to set the primary camera device as a master camera in response to the picture button being partially depressed;
   a camera condition range identifier for determining a range of camera conditions from the networkable camera devices, wherein the range of camera conditions for each networkable camera device comprises a respective amount of background light on the primary subject and a respective amount of foreground light on the primary subject;
   a camera network database for receiving subject data for a real time image of a subject from one or more of the networkable camera devices; and
   a primary subject camera identifier for determining from the subject data which networkable camera devices are shooting the primary subject whereby the primary camera device can utilize the subject data and image data from the detectors and networkable camera devices, to take a picture of the primary subject.

2. The primary camera device of claim 1, further comprising:
   an interface for requesting one or more networkable camera devices to take one or more pictures of the subject.

3. The primary camera device of claim 1, wherein said camera network database can receive camera capability data from the networkable camera devices.

4. The primary camera device of claim 1, further comprising:
   a camera setting engine for determining a range of camera settings most suitable for the range of conditions and communicating the determined settings to the networkable camera devices.

5. The primary camera device of claim 1, wherein camera settings are optimized according to an individual camera capability.

6. The primary camera device of claim 1, wherein the primary camera device and the networkable camera devices form a peer-to-peer network.

7. The primary camera device of claim 1, wherein the subject data includes subject position; networkable camera device position; networkable camera device orientation and range of the subject.

8. The primary camera device of claim 1, wherein the primary camera device and the networkable camera devices exchange one or more pictures.

9. A method for communicating between a primary camera device and other camera devices across a network, the method comprising:
- detecting orientation and position of the primary camera device and range of a subject in focus on the primary camera device;
- locating networkable camera devices for communication in response to a picture button on the primary camera device being partially depressed, wherein the primary camera device is configured to set the primary camera device as a master camera in response to the picture button being partially depressed;
- determining a range of camera conditions from the networkable camera devices, wherein the range of camera conditions for each networkable camera device comprises a respective amount of background light on the subject in focus and a respective amount of foreground light on the subject in focus;
- receiving subject data for a real time image of the subject in focus from one or more of the networkable camera devices; and
- determining from the subject data which networkable camera devices are shooting the subject in focus whereby the primary camera device can utilize the subject data and image data from the primary camera device and networkable camera devices to take a picture of the subject in focus.

10. The method of claim 9, further comprising:
- requesting one or more of the determined networkable camera devices to take one or more pictures of the subject.

11. The method of claim 9, further comprising:
- receiving camera capability data from networkable camera devices.

12. The method of claim 9, further comprising:
- determining a range of camera settings most suitable for the range of conditions and communicating those settings to the networkable camera devices.

13. The method of claim 9, wherein camera settings are optimized according to individual camera device capabilities.

14. The method of claim 9, wherein the network is a peer-to-peer network.

15. The method of claim 9, wherein the subject data includes subject position;
- networkable camera device position; networkable camera device orientation and range of the subject.

16. A computer program product for communicating between a primary camera device and other camera devices, the computer program product comprising:
- one or more computer-readable storage media and program instructions stored on the one or more computer-readable storage media, the program instructions comprising:
  - program instructions to detect orientation and position of the primary camera device and range of a subject in focus on the primary camera device;
  - program instructions to locate other networkable camera devices for communication in response to a picture button on the primary camera device being partially depressed, wherein the primary camera device is configured to set the primary camera device as a master camera in response to the picture button being partially depressed;
  - program instructions to determine a range of camera conditions from the networkable camera devices, wherein the range of camera conditions for each networkable camera device comprises a respective amount of background light on the subject in focus and a respective amount of foreground light on the subject in focus;
  - program instructions to receive subject data for a real time image of the subject in focus from one or more of the networkable camera devices; and
  - program instructions to determine from the subject data which networkable camera devices are shooting the subject in focus whereby the primary camera device can utilize the subject data and image data from the primary camera device and networkable cameras to take a picture of the subject in focus.

17. The primary camera device of claim 1, wherein the camera network identifier for locating networkable camera devices for communication is configured to locate networkable camera devices in a restricted part of the possible network area, wherein the restricted part of the possible network area comprises an area of the primary subject.

18. The primary camera device of claim 17, wherein subject data comprises, for respective networkable camera devices, a respective position of the primary subject, a respective networkable camera position based on input from a global positioning system (GPS) unit attached to the respective networkable camera, a respective networkable camera orientation based on input from a three-dimensional gyroscope compass coupled to the respective networkable camera, and a respective range between a respective networkable camera and the primary subject.

19. The primary camera device of claim 18, wherein the primary subject camera identifier is configured to take a picture of the primary subject using at least one networkable camera device and in response to the picture button of the primary camera device being fully depressed.

\* \* \* \* \*